T. J. PETERS.
TOMATO AND FRUIT SORTER AND DISTRIBUTER.
APPLICATION FILED AUG. 8, 1918.
1,340,079.
Patented May 11, 1920.
2 SHEETS—SHEET 2.
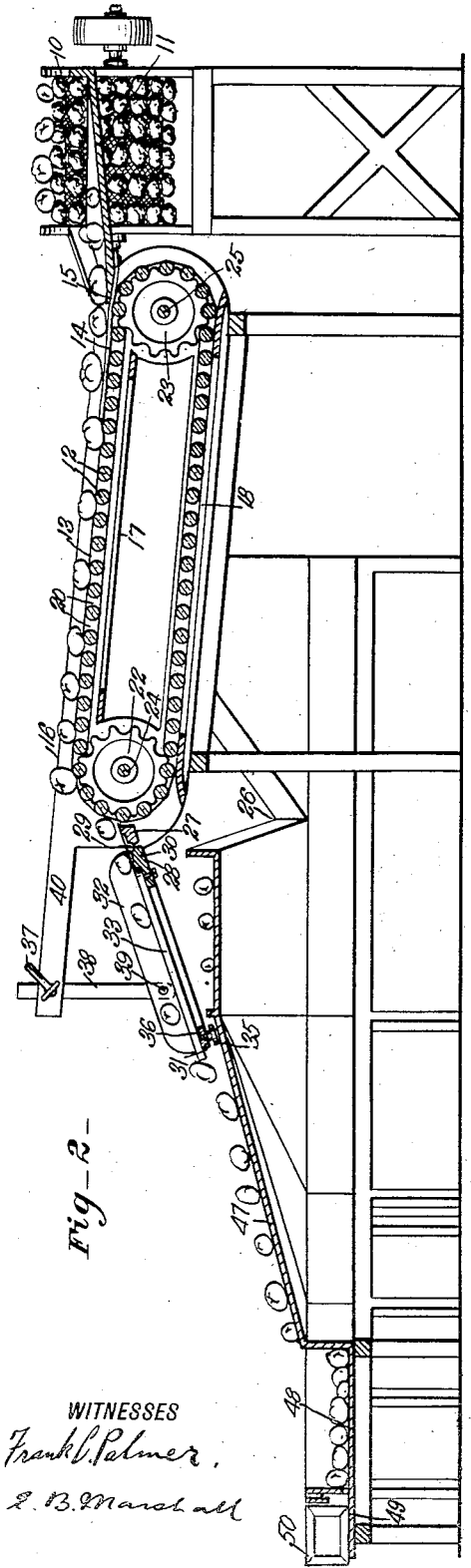
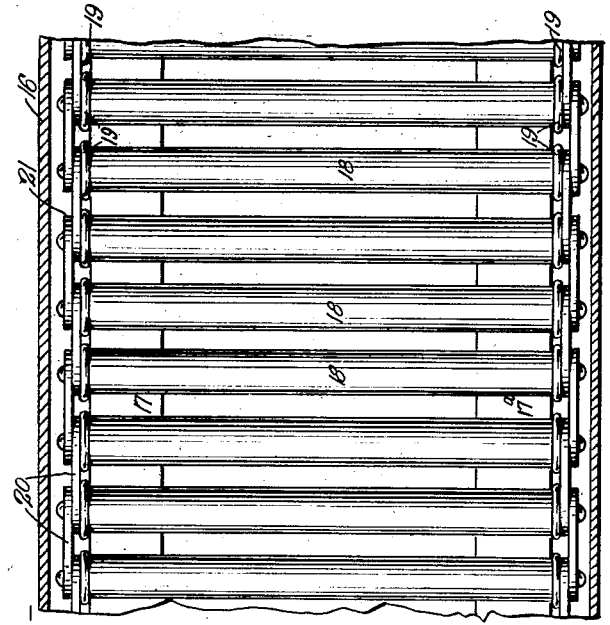
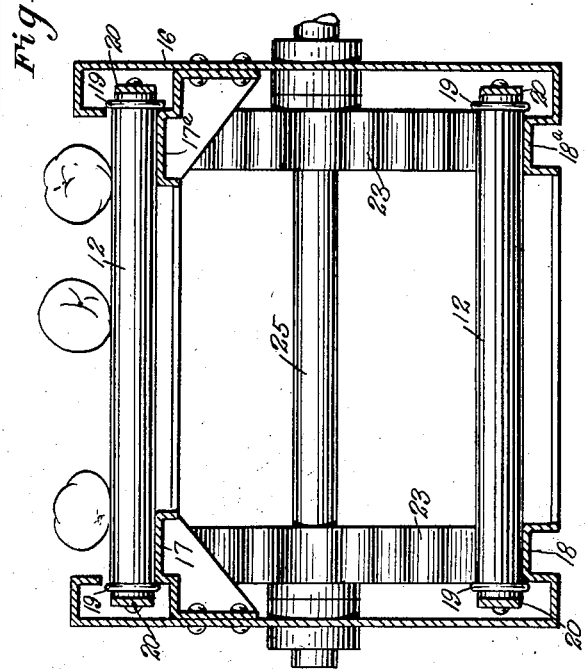
WITNESSES
INVENTOR
Thomas J. Peters
BY
ATTORNEYS

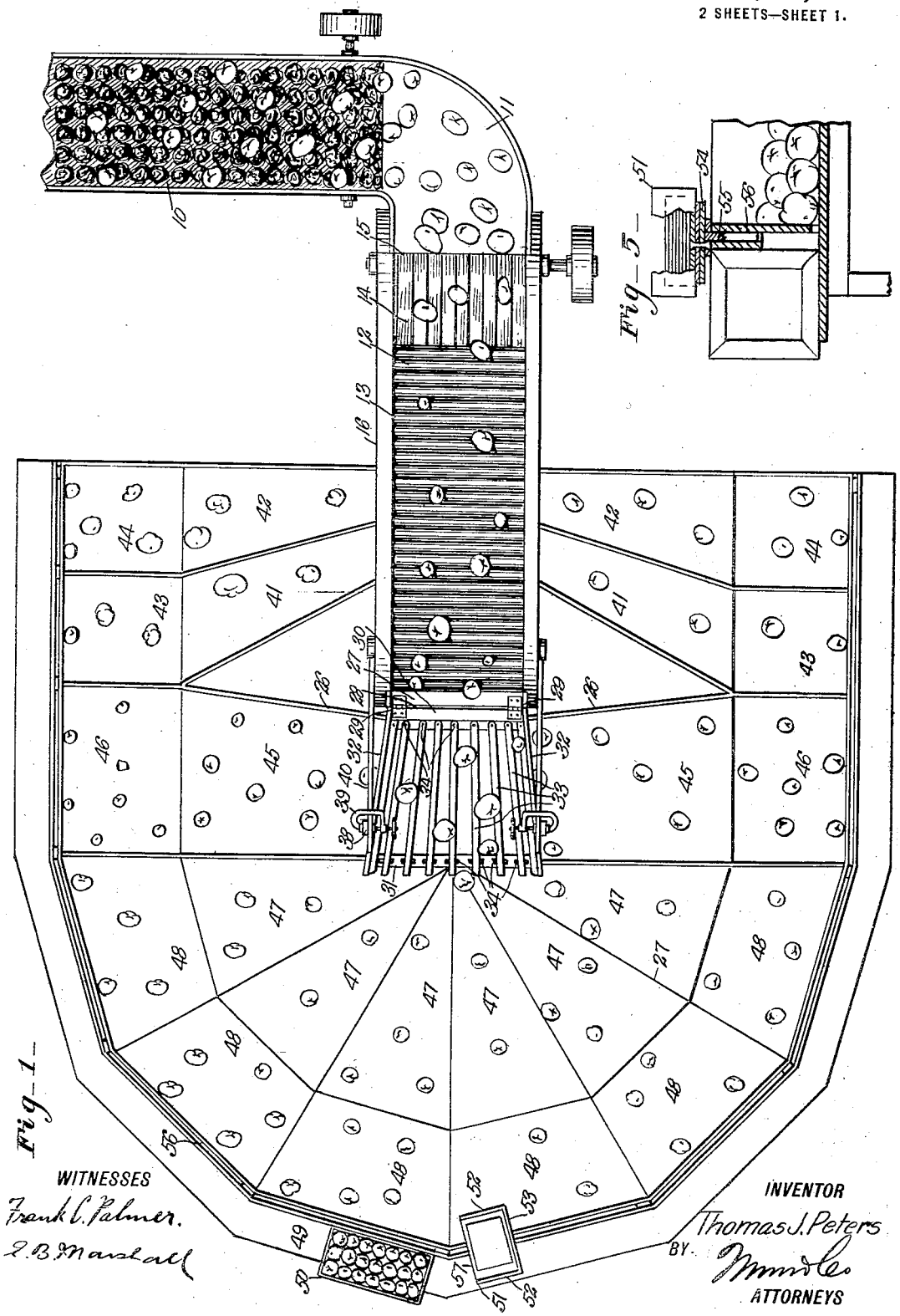

UNITED STATES PATENT OFFICE.

THOMAS JEFFERSON PETERS, OF PETERS, FLORIDA.

TOMATO AND FRUIT SORTER AND DISTRIBUTER.

1,340,079. Specification of Letters Patent. Patented May 11, 1920.

Application filed August 8, 1918. Serial No. 248,922.

*To all whom it may concern:*

Be it known that I, THOMAS J. PETERS, a citizen of the United States, and a resident of Peters, in the county of Dade and State of Florida, have invented a new and Improved Tomato and Fruit Sorter and Distributer, of which the following is a full, clear, and exact description.

My invention has for its object to provide means which will convey tomatoes and fruit without injury to a sorter where they will be turned over as they are conveyed to a sizer, to assist in the removal of off-grade and ripe fruit; the sizer which is adjustable serving to separate the tomatoes and fruit according to size as they move to a distributer which directs the tomatoes and fruit to the packers.

Another object of the invention is to provide means for holding wrapping papers, conveniently mounted on the distributer.

Additional objects of the invention will appear in the following specification in which the preferred form of my invention is described.

In the drawings similar reference characters refer to similar parts in all the views, in which—

Figure 1 is a plan view illustrating my invention.

Fig. 2 is a longitudinal sectional view.

Fig. 3 is a transverse sectional view of the sorter or grading conveyer, and

Fig. 4 is a plan view of Fig. 3.

Fig. 5 shows the wrapper box support.

By referring to the drawings, it will be seen that the tomatoes and fruit are directed by a drying belt 10 to an apron 11 which is constructed of soft material, so that it will not damage the tomatoes and fruit. This apron 11 leads the tomatoes and fruit to rollers 12 of a grading conveyer 13. As a means to prevent the tomatoes and fruit from becoming bruised when they are fed from the apron to the conveyer, I provide a plurality of rubber or other flexible strips 14 which are secured to the apron 11 at 15, and which extend out over the adjacent portion of the grading conveyer 13, as best illustrated in Figs. 1 and 2.

The construction of the grading conveyer is best illustrated in Figs. 3 and 4 in the drawings, from which it will be seen that it is constructed with a frame 16 having roller supports 17, 17ª, 18 and 18ª. The supports 17 and 17ª are disposed above the supports 18 and 18ª. The support 17 is preferably spaced from the support 17ª and the support 18 is preferably spaced from the support 18ª. The rollers 12 are disposed on these supports 17, 17ª, 18 and 18ª, and they are provided with beads 19 which engage the outer edges of the roller supports 17, 17ª, 18 and 18ª to prevent the lateral displacement of the rollers 12 relatively to the frame 16.

The rollers 12 beyond the beads 19 are journaled in bearings in links 20, the rollers forming pintles for the links and thereby connecting them together to form two sprocket chains 21, which are disposed around sprocket wheels 22 and 23, there being two of the said sprocket wheels 22 spaced apart and secured to a shaft 24, and there being two of the sprocket wheels 23 which are spaced apart and which are secured to a shaft 25; the shafts 24 and 25 being journaled in bearings in the frame 16.

It will be understood that when one of the shafts 24 or 25 is rotated, it will move the rollers 12 from one set of sprocket wheels to the other set of sprocket wheels by means of the links 20, and that as the rollers 12 frictionally engage the roller supports 17 and 17ª, the rollers will be rotated relatively to the links 20, as they are moved forwardly over the roller supports 17 and 17ª. This rotary movement of the rollers 12 will serve to turn the tomatoes and fruit which are conveyed by the said rollers, so that the graders who are stationed in the openings 26 in the distributer 27 may carefully examine all the tomatoes and other fruit without it being necessary for them to touch the good fruit.

It will be understood that when the rollers 12 travel rearwardly, they will be supported by the roller supports 18, 18ª, as is shown in Fig. 3 of the drawings.

Secured to the frame 16, there is an apron 27 for receiving the tomatoes and fruit from the grading rollers 12, the sizer 28 being hinged to the said apron 27 at 29. This sizer 28 has two transverse members 30 and 31 which are spaced apart and which are connected by the side members 32. A plurality of bars 33 are pivoted to the transverse member 30 at 34, so that they may be moved on their pivots as may be desired, to regulate the openings between the bars through which the smaller tomatoes will fall. The said bars 33 are preferably coated with rubber or other soft material, so that the tomatoes and fruit will not be bruised in any way on contact with the said bars; these bars being held in position after adjustment by means of nuts 35 which mesh with screws 36 extending downwardly from the bars 33 through transverse slots 34 in the bar 31, the said nuts 35 being turned home against the bottom of the transverse bar 31 after the bars 33 have been adjusted.

As has been stated, this sizer 28 is hinged at 29 to the apron 27, so that its lower end may be raised or may be lowered as may be desired. In order to support the sizer 28 in adjusted position, clamps 37 are provided which serve to hold the rods 38 to the frame arms 40, the said rods 38 being articulated at 39 to the sides 32 of the sizer.

As has been stated, a distributer 27 is disposed under the sizer 28 and end portions of the grading conveyer 13, this distributer having chutes 41 and 42 which lead to the bins 43 and 44, the said chutes and bins being provided for receiving off-grade and ripe tomatoes and fruit. The graders or persons packing the ripe or off-grade fruit from the grading rollers 12 are positioned in the openings 26 in the distributer, as has been stated. The tomatoes falling between the bars 43 of the sizer are directed laterally by chutes 45 to bins 46. The fruit reaching the bins 46 is of smaller diameter than the fruit which is directed to the chutes 47 which extend radially from the outer ends of the bars 33. These chutes 47 lead to the bins 48.

It will be understood that the distributer from the grading conveyer 13 and from the sizer 28 extends outwardly and downwardly, so that the chutes 41, 42, 45 and 47 will be on an incline leading to the bins. It will also be understood that the incline of the said chutes may be adjusted and determined as conditions may require.

Around the distributer 27, beyond the bins 43, 44, 46 and 48, there is a shelf 49 on which the boxes 50 may be disposed while the tomatoes or fruit are packed in the boxes from the bins. In many cases it is advisable to wrap the tomatoes and fruit with papers before packing them in the boxes 50. To assist in this, I provide wrapper containing boxes 51 which have ends 52 and one side 53. Each box 51 is pivoted to a base 54 from which depends a shank 55 which is normally disposed in a slot 56 which extends around the outer sides of the bins, as best illustrated in Fig. 1 of the drawings. With this arrangement, it is possible to dispose the paper containing box 51 at any desired point on the outer side of the distributer, and when so disposed the box 51 may be turned on its pivot so that the wrappers may be withdrawn therefrom through the open side 57 either from the right or from the left.

Having thus described my invention, I claim as new and desire to secure by Letters Patent:

1. In a fruit sorter and distributer, rotating means for conveying and turning over fruit, an apron leading to the said means, flexible strips secured to the apron and extending over and engaging the means, and a sizer for receiving the fruit carried by the said means.

2. In a fruit sorter and distributer, a rotating conveyer, means to direct fruit to the conveyer, and flexible strips secured to the means and extending over and engaging the conveyer.

3. In a fruit sorter and distributer, a wheel, a conveyer disposed around the wheel, a flexible member to direct fruit to the conveyer, and flexible strips secured to the means and extending over and engaging the conveyer.

4. In a fruit sorter and distributer, a drying belt, rotating means for conveying and turning over the fruit, an apron for receiving the fruit from the drying belt for directing it to the said means, and a plurality of flexible strips secured to the apron and extending over and engaging the said means.

5. In a fruit sorter and distributer, a rotating conveyer, means to direct fruit to the conveyer, and a plurality of flexible strips secured to the means and extending over and engaging the conveyer.

6. In a fruit sorter and distributer, a conveyer, means to direct fruit to the conveyer, and flexible strips secured to the means and extending over and engaging the conveyer.

7. In a fruit sorter and distributer, a frame having sides with two inclosed passages, one at each side of the frame and provided with longitudinally extending openings facing each other which are spaced above the bottom of the passages, roller supports extending inwardly from the sides of the frame at the bottom of the openings, rollers for rolling along the roller supports and provided with beads disposed in the passages beyond the roller supports, and means for moving the rollers longitudinally of the frame.

8. In a fruit sorter and distributer, a frame having sides with two inclosed passages, one at each side of the frame, and provided with longitudinally extending openings facing each other spaced above the bottom of the passages, sprocket wheels at the ends of the passages, sprocket chains disposed around the sprocket wheels and extending through the passages, roller supports extending inwardly from the sides of the frame at the bottom of the openings, and rollers for rolling along the roller supports and articulated to the sprocket chains.

9. In a fruit sorter and distributer, a frame having sides with two inclosed passages, one at each side of the frame, and provided with longitudinally extending openings facing each other spaced above the bottom of the passages, sprocket wheels at the ends of the passages, sprocket chains disposed around the sprocket wheels and extending through the passages, roller supports extending inwardly from the sides of the frame at the bottom of the openings, rollers for rolling along the roller supports and articulated to the sprocket chains, and beads on the rollers disposed in the passages beyond the roller supports.

10. In a fruit sorter and distributer, two drums spaced apart, conveyer means disposed around the drum, rollers journaled in bearings in the conveyer means, means to rotate the rollers relatively to the conveyer means and to turn over fruit carried on the rollers, an apron leading to the rollers, a plurality of flexible strips secured side by side to the apron and disposed over and engaging the rollers, and a sizer for receiving the fruit carried by the rollers.

11. In a fruit sorter and distributer, a soft apron for receiving fruit and having a discharge end, a plurality of soft strips secured side by side to the apron at its discharge end, and means to receive the fruit from the discharge end of the apron with which the strips engage.

12. In a fruit sorter and distributer, a sizer having bars between which fruit less than a predetermined size will fall, a distributer extending under the sizer, that portion of the distributer under the sizer extending therefrom laterally and downwardly, the distributer in front of the sizer extending radially and downwardly, the distributer in the rear of the sizer extending laterally and downwardly and being separated from that portion of the distributer which extends laterally from beneath the sizer by an opening in which an operator may stand.

13. In a fruit sorter and distributer, rotating means for conveying and turning over fruit, an apron leading to the said means, a plurality of flexible strips secured to the apron extending over and engaging the rotating means, an apron for receiving the fruit carried by the said means, a sizer hinged to the last mentioned apron, and means for supporting the sizer in adjusted position relatively to the last mentioned apron.

14. In a fruit sorter and distributer, a sizer having bars between which fruit less than a predetermined size will fall, a conveyer leading to the sizer, a distributer extending under the sizer, that portion under the distributer extending therefrom laterally and downwardly, the distributer in front of the sizer extending radially and downwardly, the distributer extending from the conveyer laterally and being separated from that portion of the distributer which extends from beneath the sizer by an opening in which an operator may stand.

15. In a fruit sorter and distributer, means for conveying and turning over fruit, a sizer beyond the said means for receiving fruit from the said means, bins, and a distributer for directing the fruit from the sizer to the bins.

16. In a fruit sorter and distributer, means for conveying and turning over fruit, a sizer beyond the said means for receiving fruit from the said means, and a distributer for directing the fruit from the sizer.

17. In a fruit sorter and distributer, a sizer having bars between which fruit less than a predetermined size will fall, a distributer extending under the sizer, that portion of the distributer under the sizer extending laterally and downwardly, the distributer in front of the sizer extending radially and downwardly, and a shelf around the distributer for supporting boxes in which fruit is to be packed.

18. In a fruit sorter and distributer, bins, a distributer extending outwardly and downwardly to the bins, there being an opening along the outer edge of the bins, a shank removably disposed in the opening, a box with two ends and a side mounted to rotate on a vertical axis on the shank, and a shelf on the outer side of the bins.

19. In a fruit sorter and distributer, a bin having a vertical opening through one of its sides, a shank disposed in the opening, a box with two sides and an end mounted to rotate on a vertical axis on the shank, and a shelf on the side of the bin.

20. In a fruit sorter and distributer, a sizer, a distributer which extends under the sizer, the distributer in the rear of the sizer extending laterally downwardly and forwardly to a portion of the distributer extending from beneath the sizer and being separated from said portion of the distributer at the sizer by an opening in which an operator may stand.

21. In a fruit sorter and distributer, two longitudinally extending roller supports spaced apart, links beyond the roller supports and rollers extending from one roller support to the other for rolling along the roller supports, the rollers forming pintles for the links.

THOMAS JEFFERSON PETERS.